(12) United States Patent
Zhao et al.

(10) Patent No.: US 9,593,805 B2
(45) Date of Patent: Mar. 14, 2017

(54) LIQUID DISTRIBUTING VALVE

(71) Applicant: AUTOL TECHNOLOGY CO., LTD, Zhengzhou (CN)

(72) Inventors: Daping Zhao, Zhengzhou (CN); Jianhua Li, Zhengzhou (CN); Yankai Si, Zhengzhou (CN); Lifeng Ma, Zhengzhou (CN)

(73) Assignee: AUTOL TECHNOLOGY CO., LTD, Zhengzhou (CN)

( * ) Notice: Subject to any disclaimer, the term of this patent is extended or adjusted under 35 U.S.C. 154(b) by 148 days.

(21) Appl. No.: 14/426,315

(22) PCT Filed: Jul. 22, 2013

(86) PCT No.: PCT/CN2013/079783
§ 371 (c)(1),
(2) Date: Mar. 5, 2015

(87) PCT Pub. No.: WO2014/036860
PCT Pub. Date: Mar. 13, 2014

(65) Prior Publication Data
US 2015/0233525 A1 Aug. 20, 2015

(30) Foreign Application Priority Data
Sep. 10, 2012 (CN) .......................... 2012 1 0332420

(51) Int. Cl.
*F16N 25/02* (2006.01)
*F16N 13/22* (2006.01)
*F16N 13/02* (2006.01)

(52) U.S. Cl.
CPC ............. *F16N 25/02* (2013.01); *F16N 13/02* (2013.01); *F16N 13/22* (2013.01)

(58) Field of Classification Search
CPC .................................. F16N 25/02; F16N 13/02
See application file for complete search history.

(56) References Cited

U.S. PATENT DOCUMENTS

| 4,157,132 A | 6/1979 | Kramer |
| 4,750,314 A * | 6/1988 | Mietz ..................... B65D 83/42 53/470 |

(Continued)

FOREIGN PATENT DOCUMENTS

| CN | 2324373 | 6/1999 |
| CN | 2455997 | 10/2001 |

(Continued)

OTHER PUBLICATIONS

PCT International Search Report dated Oct. 31, 2013 for PCT International Application No. PCT/CN2013/079783 (4 pages).

(Continued)

*Primary Examiner* — William E Dondero
*Assistant Examiner* — Mark K Buse
(74) *Attorney, Agent, or Firm* — Remarck Law Group PLC

(57) ABSTRACT

A liquid distributing valve includes a housing, an oil supply passage, an oil storage valve and a two-position three-way valve. The oil storage valve is separated into an oil storage chamber and an oil pressing chamber by a piston, and the oil storage chamber is in communication with an oil discharge port and has a spring pressing against the piston. The two-position three-way valve includes a valve body cavity having an oil inlet in communication with the oil supply passage, a valve core and a valve seat having a core hole in communication with the oil storage chamber via a bypass oil passage. When the valve core is at one position, the oil inlet is blocked off, and the oil pressing chamber is in communication with the oil storage chamber. When the valve core is at another position, the core hole is blocked off, lubricant enters the oil inlet.

15 Claims, 2 Drawing Sheets

(56) References Cited

U.S. PATENT DOCUMENTS

| | | | | |
|---|---|---|---|---|
| 7,082,967 B2* | 8/2006 | Sarajian | ................ | F16K 15/148 |
| | | | | 137/512.15 |
| 7,249,694 B2* | 7/2007 | Masuda | ................ | B65D 35/14 |
| | | | | 222/212 |
| 8,083,332 B2* | 12/2011 | Price | .................... | B41J 2/17596 |
| | | | | 137/543 |
| 2010/0096218 A1* | 4/2010 | Paluncic | ................ | F16N 25/02 |
| | | | | 184/7.4 |

FOREIGN PATENT DOCUMENTS

| | | |
|---|---|---|
| CN | 2455998 | 10/2001 |
| CN | 201057351 | 5/2008 |
| CN | 100464109 | 2/2009 |
| CN | 101776200 A | 7/2010 |
| CN | 102829316 A | 12/2012 |
| CN | 202812735 U | 3/2013 |
| GB | 2004332 A | 3/1979 |
| GB | 2086545 A | 5/1982 |
| JP | S5220637 | 5/1977 |
| JP | H0825175 A | 1/1996 |
| JP | 2000199598 | 7/2000 |
| JP | 2005201348 A | 7/2005 |
| JP | 2012026505 A | 2/2012 |
| KR | 20110017206 A | 2/2011 |
| KR | 101171636 B1 | 8/2012 |

OTHER PUBLICATIONS

Extended European Search Report dated Jun. 1, 2016 for European Patent Application No. 13834894.1, 7 pages.

* cited by examiner

US 9,593,805 B2

LIQUID DISTRIBUTING VALVE

This application is the national phase of International Application No. PCT/CN2013/079783, titled "LIQUID DISTRIBUTING VALVE", filed on Jul. 22, 2013, which claims the benefit of priority to Chinese Patent Application No. 201210332420.0 titled "LIQUID DISTRIBUTION VALVE", filed with the Chinese State Intellectual Property Office on Sep. 10, 2012, and the entire disclosures of both applications are incorporated herein by reference

TECHNICAL FIELD

The present application relates to the field of lubrication technology, and particularly to a liquid distribution valve.

BACKGROUND

Presently, on some of the advanced industrial machinery equipments, a centralized lubrication device is employed to lubricate all the lubricating points on the machine, and the lubrication is uniformly performed with fixed time and fixed quantity. This kind of lubrication device generally includes a progressive distributor and a decompression distributor. The progressive distributor has a compact structure and generally used in occasions needing viscous grease lubrication, however it has a low user satisfaction due to its defects of having a complicated structure, a high manufacturing cost, a high failure rate, and a high maintenance difficulty. The decompression distributor commonly used in the market presently has a simple structure and but can only be used in occasions needing low pressure and thin oil lubrication, such as the machine tools.

In view of this, to address the above technical issues, it is urgent to design a liquid distribution valve assembly which has a high reliability, being easy to maintain and adaptable to various kinds of lubrication requirements, thereby satisfying the lubrication requirements of different kinds of mechanical equipments.

SUMMARY

An object of the present application is to provide a liquid distribution valve which has a high reliability, being easy to maintain and adaptable to lubrication requirements of various mechanical equipments.

For realizing the above technical objects, a liquid distribution valve is provided according to the present application, which includes at least one housing, an oil supply passage, and at least one oil storage valve and at least one two-position three-way valve both using a respective inner cavity of the housing as carrier, and each oil storage valve corresponds to one two-position three-way valve; a valve chamber of the oil storage valve is separated into an oil storage chamber and an oil pressing chamber by a piston, and the oil storage chamber is in communication with an oil discharge port and has a spring pressing against the piston; wherein the oil supply passage is arranged inside the housing; the two-position three-way valve includes a valve body cavity, a valve core and a valve seat, the valve body cavity is in communication with the oil pressing chamber via an oil exchanging passage, the valve body cavity has an oil inlet in communication with the oil supply passage, and the valve seat has a core hole in communication with the oil storage chamber via a bypass oil passage; in a case that the valve core is at a first valve position, the valve core blocks off the oil inlet, and the oil pressing chamber is in communication with the oil storage chamber through the oil exchanging passage, the valve body cavity, the core hole and the bypass oil passage; and in a case that the valve core is at a second valve position, the valve core blocks off the core hole, and the oil inlet is in communication with the oil pressing chamber via the valve body cavity and the oil exchanging passage.

Preferably, the valve core is an elastic member having an umbrella-shaped edge, the umbrella-shaped edge is configured to cooperate with a periphery of the valve body cavity; in a case that the valve core is at the first valve position, the umbrella-shaped edge stretches out in a radial direction to axially seal the valve body cavity; and in a case that the valve core is at the second valve position, the umbrella-shaped edge contracts in the radial direction, and a core portion of the valve core blocks off the core hole.

Preferably, the valve core includes a guide seat having an axial fluid passage, a sealing member having an elastic umbrella-shaped edge, and a plug, the guide seat, the sealing member and the plug are connected in order in an axial direction to form a whole, and the guide seat and the elastic umbrella-shaped edge are both configured to cooperate with a periphery of the valve body cavity; in a case that the valve core is at the first valve position, the elastic umbrella-shaped edge stretches out in a radial direction to axially seal the valve body cavity; and in a case that the valve core is at the second valve position, the elastic umbrella-shaped edge contracts in the radial direction, and the valve core blocks off the core hole.

Preferably, the oil discharge port is provided with a one-way valve.

Preferably, the core hole of the valve seat is provided with an elastic sealing ring.

Preferably, the bypass oil passage is located inside the housing.

Preferably, the oil discharge port is located at the oil storage chamber.

Preferably, the oil discharge port is located at the bypass oil passage or the core hole.

Preferably, an indication rod is fixed on the piston, and the indication rod passes through the oil storage chamber, and has an end portion located outside the housing.

Preferably, the housing includes at least two of the oil storage valves, the oil storage chambers of the at least two of the oil storage valves are in communication with each other, one of the oil discharge ports of the oil storage chambers in communication with each other is remained, and other oil discharge ports thereof are blocked off.

Preferably, the liquid distribution valve includes at least two of the housings, and the oil supply passages of all the housings are in communication with each other.

The liquid distribution valve provided according to the present application includes at least one housing, an oil supply passage, and at least one oil storage valve and at least one two-position three-way valve both using a respective inner cavity of the housing as carrier, and each oil storage valve corresponds to one two-position three-way valve. A valve chamber of the oil storage valve is separated into an oil storage chamber and an oil pressing chamber by a piston, and the oil storage chamber is in communication with an oil discharge port and has a spring pressing against the piston. The oil supply passage is arranged inside the housing. The two-position three-way valve includes a valve body cavity, a valve core and a valve seat, the valve body cavity is in communication with the oil pressing chamber via an oil exchanging passage, the valve body cavity has an oil inlet in communication with the oil supply passage, and the valve seat has a core hole in communication with the oil storage chamber via a bypass oil passage. In a case that the valve core is at a first valve position, the valve core blocks off the oil inlet, and the oil pressing chamber is in communication with the oil storage chamber through the oil exchanging passage, the valve body cavity, the core hole and the bypass oil passage; and in a case that the valve core is at a second valve position, the valve core blocks off the core hole, and the oil inlet is in communication with the oil pressing chamber via the valve body cavity and the oil exchanging passage.

When a lubricant in the oil supply passage is pressurized, the lubricant enters into the valve body cavity in communication with the oil supply passage. The lubricant firstly passes through the oil inlet, then presses the two-position three-way valve to position the two-position three-way valve at the second valve position, and then the lubricant enters into the oil pressing chamber through the valve body cavity and the oil exchanging passage, and meanwhile, the two-position three-way valve can avoid the lubricant entering into the core hole. In the process of the lubricant entering into the oil pressing chamber, the lubricant pushes the piston and compresses the spring, and a volume of the oil pressing chamber is increased while a volume of the oil storage chamber is decreased in this process. If lubricant already exists inside the oil storage chamber before the oil supply passage is pressurized, the lubricant in the oil storage chamber will be discharged via the oil discharge port, to be delivered to a specified lubricating point via a pipeline connected to the oil discharge port.

When the pressurization on the oil supply passage is stopped, the piston is pushed backwards under the action of the spring, and the volume of the oil storage chamber is increased while the volume of the oil pressing chamber is decreased. The lubricant in the oil pressing chamber enters into the valve body cavity via the oil exchanging passage and pushes the two-position three-way valve to position the two-position three-way valve at the first valve position. Then, the lubricant enters into the oil storage chamber with the increased volume through the core hole and the bypass oil passage, and the two-position three-way valve may prevent the lubricant from flowing back to the oil supply passage. When the oil supply passage is pressurized again, the lubricant entering into the housing during the last pressurization is inside the oil storage chamber, and this pressurization may convey the lubricant entering into the housing in the last pressurization to a specific lubricating point.

The liquid distribution valve is applicable to the lubrication requirements of lubricating grease with various pressures, various viscosities and various quantities, meanwhile has a compact structure, a high reliability and a wide applicability, and is easy to maintain, and can satisfy the lubrication requirements of mechanical equipments in various environmental conditions, and can also be used for accurate distribution of fluids. Besides, lubrication for the lubricating points in real time may be realized without a lag in the operating process of the liquid distribution valve, namely, the lubricant is discharged via the oil discharge port at the same time a main oil way is pressurized.

In one solution, the valve core is an elastic member having an umbrella-shaped edge, the umbrella-shaped edge is configured to cooperate with a periphery of the valve body cavity;

in a case that the valve core is at the first valve position, the umbrella-shaped edge stretches out in a radial direction to axially seal the valve body cavity; and in a case that the valve core is at the second valve position, the umbrella-shaped edge contracts in the radial direction, and a core portion of the valve core blocks off the core hole.

In another solution, the valve core includes a guide seat having an axial fluid passage, a sealing member having an elastic umbrella-shaped edge, and a plug, the guide seat, the sealing member and the plug are connected in order in an axial direction to form a whole, and the guide seat and the elastic umbrella-shaped edge are both configured to cooperate with a periphery of the valve body cavity; in a case that the valve core is at the first valve position, the elastic umbrella-shaped edge stretches out in a radial direction to axially seal the valve body cavity; and in a case that the valve core is at the second valve position, the elastic umbrella-shaped edge contracts in the radial direction, and the valve core blocks off the core hole.

Figure 1:
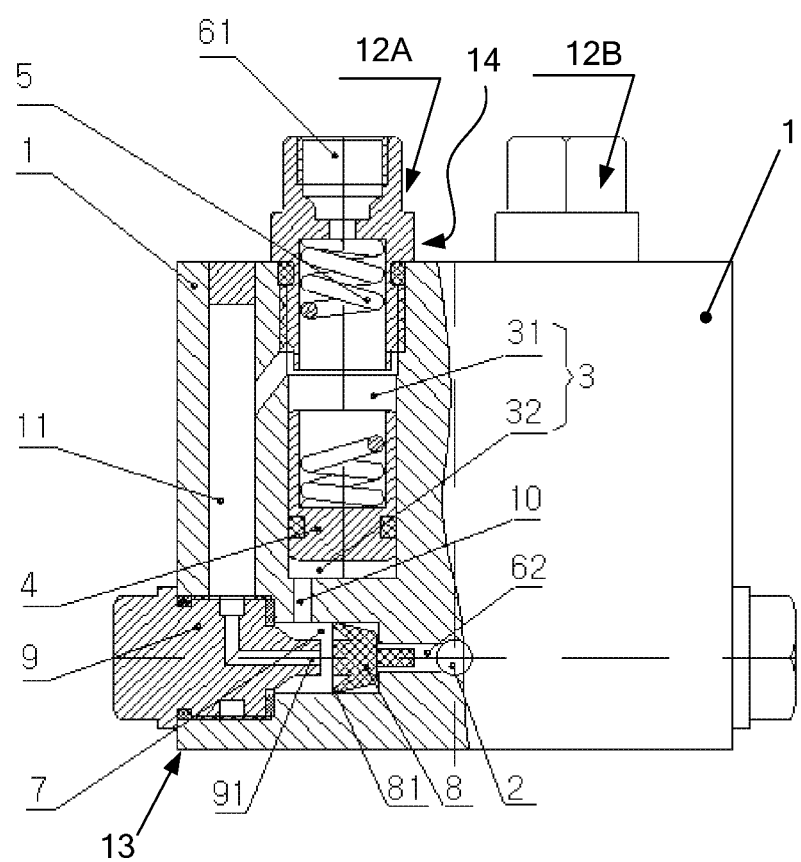
FIG. 1 is a schematic view showing the structure of an embodiment of a liquid distribution valve according to the present application.
Figure 2:
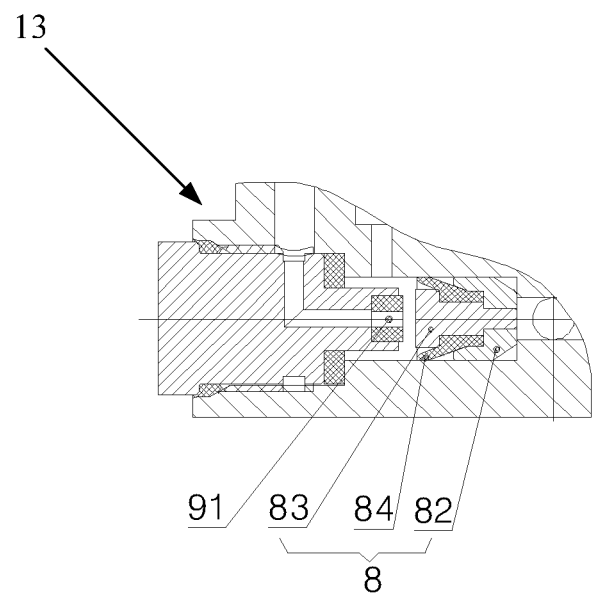
FIG. 2 is a schematic view showing the structure of an embodiment of a two-position three-way valve of the liquid distribution valve according the present application.
Figure 3:
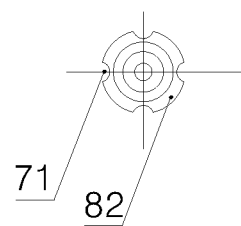
FIG. 3 is a side sectional view of a guide seat of the two-position three-way valve in FIG. 2.

Reference numerals in FIGS. 1 to 3:

| 1   | housing,              | 2   | oil supply passage,    |
|-----|-----------------------|-----|------------------------|
| 12A | oil storage valve,    | 12B | oil storage valve,     |
| 13  | two-position three-way valve, | 31  | oil storage chamber, |
| 3   | valve chamber,        | 4   | piston,                |
| 32  | oil pressing chamber, | 61  | oil discharge port,    |
| 5   | spring,               | 7   | valve body cavity,     |
| 62  | oil inlet,            | 8   | valve core,            |
| 71  | fluid passage,        | 82  | guide seat,            |
| 81  | umbrella-shaped edge, | 84  | elastic umbrella-shaped edge, |
| 83  | plug,                 | 91  | core hole,             |
| 9   | valve seat,           | 14  | indication rod,        |
| 10  | oil exchanging passage, and | 11  | bypass oil passage. |

DETAILED DESCRIPTION

A liquid distribution valve is provided according to the present application, which has a high reliability, being easy to maintain and adaptable to lubrication requirements of various mechanical equipments.

For making those skilled in the art better understand the solutions of the present application, the present application is described in detail in conjunction with accompany drawings and embodiments.

Reference is made to FIG. 1, which is a schematic view showing the structure of an embodiment of a liquid distribution valve according to the present application.

A liquid distribution valve is provided according to an embodiment of the present application, which includes at least one housing 1, an oil supply passage 2, and at least one oil storage valve 12A and at least one two-position three-way valve 13 each using a respective internal cavity of the housing 1 as carrier, and each oil storage valve 12A corresponds to one two-position three-way valve 13. A valve chamber 3 of the oil storage valve 12A is separated into an oil storage chamber 31 and an oil pressing chamber 32 by a piston 4, and the oil storage chamber 31 is in communication with an oil discharge port 61 and has a spring 5 pressing against the piston 4. The oil supply passage 2 is arranged inside the housing 1. The two-position three-way valve 13 includes a valve body cavity 7, a valve core 8, and a valve seat 9. The valve body cavity 7 is in communication with the oil pressing chamber 32 via an oil exchanging passage 10, and an oil inlet 62 of the valve body cavity 7 is in communication with the oil supply passage 2. A core hole 91 of the valve seat 9 is in communication with the oil storage chamber 31 by a bypass oil passage 11. When the valve core 8 is at a first valve position, the valve core 8 blocks off the oil inlet 62, the oil pressing chamber 32 is in communication with the oil storage chamber 31 via the oil exchanging passage 10, the valve body cavity 7, the core hole 91 and the bypass oil passage 11. When the valve core 8 is at a second valve position, the valve core 8 blocks off the core hole 91, and the oil inlet 62 is in communication with the oil pressing chamber 32 via the valve body cavity 7 and the oil exchanging passage 10.

When a lubricant in the oil supply passage 2 is pressurized, the lubricant enters into the valve body cavity 7 in communication with the oil supply passage 2. The lubricant firstly passes through the oil inlet 62, then presses the two-position three-way valve 13 to position the two-position three-way valve 13 at the second valve position, and then the lubricant enters into the oil pressing chamber 32 through the valve body cavity 7 and the oil exchanging passage 10, and meanwhile, the two-position three-way valve 13 can avoid the lubricant entering into the core hole 91.

In the process of the lubricant entering into the oil pressing chamber 32, the lubricant pushes the piston 4 and compresses the spring 5, and a volume of the oil pressing chamber 32 is increased while a volume of the oil storage chamber 31 is decreased in this process. If lubricant already exists inside the oil storage chamber 31 before the oil supply passage 2 is pressurized, the lubricant in the oil storage chamber 31 will be discharged via the 20 oil discharge port 61, to be delivered to a specified lubricating point via a pipeline connected to the oil discharge port 61.

When the pressurization on the oil supply passage 2 is stopped, the piston 4 is pushed backwards under the action of the spring 5, and the volume of the oil storage chamber 31 is increased while the volume of the oil pressing chamber 32 is decreased. The lubricant in the oil pressing chamber 32 enters into the valve body cavity 7 via the oil exchanging passage 10 and pushes the two-position three-way valve 13 to position the two-position three-way valve 13 at the first valve position. Then, the lubricant enters into the oil storage chamber 31 with the increased volume through the core hole 91 and the bypass oil passage 11, and the two-position three-way valve 13 may prevent the lubricant from flowing back to the oil supply passage 2.

When the oil supply passage 2 is pressurized again, the lubricant entering into the housing 1 during the last pressurization is inside the oil storage chamber 31, and this pressurization may convey the lubricant entering into the housing 1 in the last pressurization to a specific lubricating point.

The oil supply passage 2 is arranged inside the housing 1, which may facilitate connecting the oil storage chambers 31 of all the housings 1, to satisfy the requirements of different lubrication quantities.

The core hole 91 of the valve seat 9 and the bypass oil passage 11 are connected to jointly communicate the valve body cavity 7 with the oil storage chamber 31. The valve seat 9 is a separate component which can cooperate with the housing 1, and an end portion of the valve seat 9 that contacts the valve core 8 has a stepped passage. When the pressurization on the oil supply passage 2 is stopped, the lubricant is in the stepped passage when entering into the valve body cavity 7 through the oil exchanging passage 10, and then presses the valve core 8 to move the valve core 8 towards the first valve position. When the housing 1 is machined, it is generally required to machine the valve chamber 3 and the valve body cavity 7; and it is generally required to machine the valve core hole 91 when the valve seat 9 is machined. This structure not only facilitates machining the housing 1 but also facilitates machining the valve seat 9.

The liquid distribution valve is applicable to the lubrication requirements of lubricating grease with various pressures, various viscosities and various quantities, meanwhile has a compact structure, a high reliability and a wide applicability, and is easy to maintain, and can satisfy the lubrication requirements of mechanical equipments in various environmental conditions, and can also be used for accurate distribution of fluids. Besides, lubrication for the lubricating points in real time may be realized without a lag in the operating process of the liquid distribution valve, namely, the lubricant is discharged via the oil discharge port and conveyed to a specific lubricating point at the same time a main oil way is pressurized.

In a preferred embodiment, the valve core 8 is an elastic member having an umbrella-shaped edge 81, and the umbrella-shaped edge 81 is configured to cooperate with a periphery of the valve body cavity 7. When the valve core 8 is at the first valve position, the umbrella-shaped edge 81 stretches out in a radial direction to seal the valve body cavity 7 in an axial direction. When the valve core 8 is at the second valve position, the umbrella-shaped edge 81 contracts in the radial direction, and a core portion of the valve core 8 blocks off the core hole 91.

When an umbrella-shaped outer side of the umbrella-shaped edge 81 is subjected to the pressure of liquid, the valve core 8 moves to the second valve position to come into contact with the valve seat 9 and press against the core hole 91, the umbrella-shaped edge 81 contracts in the radial direction under the action of the liquid pressure, and the lubricant enters into the oil pressing chamber 32 via the oil inlet 62, the valve body cavity 7 and the oil exchanging passage 10.

When an umbrella-shaped inner side of the umbrella-shaped edge 81 is subjected to the pressure of liquid, the valve core 8 moves to the first valve position, the valve core 8 blocks off the oil inlet 62, the umbrella-shaped edge 81 stretches out in the radial direction under the action of the liquid pressure, and the lubricant inside the oil pressing chamber 32 enters into the oil storage chamber 31 via the oil exchanging passage 10, the valve body cavity 7, the core hole 91 and the bypass oil passage 11.

Reference is made to FIGS. 2 and 3. FIG. 2 is a schematic view showing the structure of an embodiment of the two-position three-way valve of 13 of the liquid distribution valve according to the present application, and FIG. 3 is a side sectional view of a guide seat of the two-position three-way valve 13 in FIG. 2.

In another preferred embodiment, the valve core 8 includes a guide seat 82 having an axial fluid passage 71, a seal member having an elastic umbrella-shaped edge 84, and a plug 83. The guide seat 82, the sealing member and the plug 83 are connected in order in the axial direction to form a whole, and the guide seat 82 and the elastic umbrella-shaped edge 84 are both capable of cooperating with a periphery of the valve body cavity 7. When the valve core 8 is at the first valve seat, the elastic umbrella-shaped edge 84 stretches out in a radial direction to seal the valve body cavity 7 in an axial direction. When the valve core 8 is at the second valve position, the elastic umbrella-shaped 84 contracts in the radial direction, and the plug 83 of the valve core 8 blocks off the core hole 91.

The two-position three-way valve 13 with this structure may also realize the functions of the above embodiment, and may further be applied in situations with high pressure. When the lubricant has a high pressure, the two-position three-way valve 13 may not be deflected due to the guide effect of the guide seat 82, and can still operate normally. When the two-position three-way valve 13 is at the second valve position, the plug 83 presses against the core hole 91.

In the above embodiments, a one-way valve may be arranged at the oil discharge port 61, thus backflow of the lubricant may be prevented when the liquid distribution valve is operating.

The core hole 91 of the valve seat 9 may be provided with an elastic sealing ring. The two-position three-way valve 13 at the second valve position abuts against 5 the elastic sealing ring, which facilitates blocking off the core hole 91.

Furthermore, the bypass oil passage 11 may be located inside the housing 1 and be a blind hole structure of the housing 1.

In a specific embodiment, the oil discharge port 61 may be located at the oil storage chamber 31, and of course, the oil discharge port 61 may also be located at the bypass oil passage 11 or the core hole 91. Apparently, the oil discharge port 61 may be located at a cavity in communication with the oil storage chamber 31, and when the volume of the oil storage chamber 31 is decreased, the cavity in communication with the oil storage chamber 31 is also decreased, thus the lubricant may be discharged via the oil discharge port 61.

When the oil discharge port 61 is not located at the oil storage chamber 31, an indication rod 14 may be mounted on the piston 4. The indication rod 14 passes through the oil storage chamber 31 and has an end portion located outside the housing 1, thus the position and movement of the piston 4 may be determined by observing the indication rod 14.

It should be noted that, the sealing at an exit of the piston rod should be guaranteed to ensure free movement of the piston rod and ensure that there is no lubricant leakage.

In each of the above embodiments, the housing 1 may include at least two oil storage valves 12A and 12B. When the volume of the oil storage chamber 31 of one oil storage valve 12A or 12B cannot satisfy the lubricant quantity needed by the lubricating point, the at least two oil storage valves 12A and 12B can be communicated to each other according to the requirements, and one oil discharge port 61 of the oil storage chambers 31 in communication with each other is remained and other oil discharge ports 61 are blocked off.

In this case, when the liquid distribution valve is operating, the lubricant inside the oil storage chambers 31, in communication with each other, is all discharged via the remained oil discharge port 61 and conveyed to a specific lubricating point, thereby satisfying the requirement of a large lubricant quantity.

Of course, the above requirement may also be realized by arranging pipelines connected to the oil discharge ports 61. The plurality of pipelines connected to the oil discharge ports 61 are communicated to each other to convey the lubricant to the lubricating point via a common pipeline.

The liquid distribution valve may also include at least two housings 1, the oil supply passages 2 of the housings 1 are in communication with each other, and the oil supply passages 2 are configured to connects the housings 1 in series.

The liquid distribution valve according to the present application is described in detail hereinbefore. The principle and the embodiments of the present application are illustrated herein by specific examples. The above description of examples is only intended to help the understanding of the method and the spirit of the present application. It should be noted that, for the person skilled in the art, a few of modifications and improvements may be made to the present application without departing from the principle of the present application, and these modifications and improvements are also deemed to fall into the scope of the present application defined by the claims.

The invention claimed is:

1. A liquid distribution valve, comprising at least one housing, an oil supply passage, and at least one oil storage valve and at least one two-position three-way valve both using a respective inner cavity of the housing as a carrier, and each oil storage valve corresponding to one two-position three-way valve; a valve chamber of the oil storage valve being separated into an oil storage chamber and an oil pressing chamber by a piston, and the oil storage chamber being in communication with an oil discharge port and having a spring pressing against the piston; wherein the oil supply passage is arranged inside the housing; the two-position three-way valve comprises a valve body cavity, a valve core and a valve seat, the valve body cavity is in communication with the oil pressing chamber via an oil exchanging passage, the valve body cavity has an oil inlet in communication with the oil supply passage, and the valve seat has a core hole in communication with the oil storage chamber via a bypass oil passage;

in a case that the valve core is at a first valve position, the valve core blocks off the oil inlet, and the oil pressing chamber is in communication with the oil storage chamber through the oil exchanging passage, the valve body cavity, the core hole and the bypass oil passage; and in a case that the valve core is at a second valve position, the valve core blocks off the core hole, and the oil inlet is in communication with the oil pressing chamber via the valve body cavity and the oil exchanging passage;

wherein the valve core comprises a guide seat having an axial fluid passage, a sealing member having an elastic umbrella-shaped edge, and a plug, the guide seat, the sealing member and the plug are connected in order in an axial direction to form a whole, and the guide seat and the elastic umbrella-shaped edge are both configured to cooperate with a periphery of the valve body cavity; in a case that the valve core is at the first valve position, the elastic umbrella-shaped edge stretches out in a radial direction to axially seal the valve body cavity; and in a case that the valve core is at the second valve position, the elastic umbrella-shaped edge contracts in the radial direction, and the valve core blocks off the core hole.

2. The liquid distribution valve according to claim 1, wherein the valve core is an elastic member having an umbrella-shaped edge, the umbrella-shaped edge is configured to cooperate with a periphery of the valve body cavity; in a case that the valve core is at the first valve position, the umbrella-shaped edge stretches out in a radial direction to axially seal the valve body cavity; and in a case that the valve core is at the second valve position, the umbrella-shaped edge contracts in the radial direction, and a core portion of the valve core blocks off the core hole.

3. The liquid distribution valve according to claim 2, wherein the bypass oil passage is located inside the housing.

4. The liquid distribution valve according to claim 2, wherein the oil discharge port is located at the oil storage chamber.

5. The liquid distribution valve according to claim 2, wherein the housing comprises at least two of the oil storage valves, the oil storage chambers of the at least two of the oil storage valves are in communication with each other, one of the oil discharge ports of the oil storage chambers in communication with each other is remained, and other oil discharge ports thereof are blocked off.

6. The liquid distribution valve according to claim 2, wherein the liquid distribution valve comprises at least two of the housings, and the oil supply passages of all the housings are in communication with each other.

7. The liquid distribution valve according to claim 1, wherein the bypass oil passage is located inside the housing.

8. The liquid distribution valve according to claim 1, wherein the oil discharge port is located at the oil storage chamber.

9. The liquid distribution valve according to claim 1, wherein an indication rod is fixed on the piston, and the indication rod passes through the oil storage chamber, and has an end portion located outside the housing.

10. The liquid distribution valve according to claim 1, wherein the housing comprises at least two of the oil storage valves, the oil storage chambers of the at least two of the oil storage valves are in communication with each other, one of the oil discharge ports of the oil storage chambers in communication with each other is remained, and other oil discharge ports thereof are blocked off.

11. The liquid distribution valve according to claim 1, wherein the liquid distribution valve comprises at least two of the housings, and the oil supply passages of all the housings are in communication with each other.

12. The liquid distribution valve according to claim 1, wherein the bypass oil passage is located inside the housing.

13. The liquid distribution valve according to claim 1, wherein the oil discharge port is located at the oil storage chamber.

14. The liquid distribution valve according to claim 1, wherein the housing comprises at least two of the oil storage valves, the oil storage chambers of the at least two of the oil storage valves are in communication with each other, one of the oil discharge ports of the oil storage chambers in communication with each other is remained, and other oil discharge ports thereof are blocked off.

15. The liquid distribution valve according to claim 1, wherein the liquid distribution valve comprises at least two of the housings, and the oil supply passages of all the housings are in communication with each other.

\* \* \* \* \*